(12) United States Patent
Cahill et al.

(10) Patent No.: US 6,346,308 B1
(45) Date of Patent: *Feb. 12, 2002

(54) ACTIVE OXYGEN SCAVENGER COMPOSITIONS AND THEIR USE IN PACKAGING ARTICLES

(75) Inventors: Paul J. Cahill, Wheaton; Joel A. Richardson, Naperville; George E. Rotter, Naperville; Granville L. Smyser, Naperville; Roman F. Barski, Jr., Arlington Heights; Raymond V. Wass, Glen Ellyn; Walter M. Nyderek, Tinley Park, all of IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/485,517

(22) PCT Filed: Mar. 17, 1998

(86) PCT No.: PCT/US98/05239
§ 371 Date: May 9, 2000
§ 102(e) Date: May 9, 2000

(87) PCT Pub. No.: WO99/15433
PCT Pub. Date: Apr. 1, 1999

Related U.S. Application Data

(63) Continuation-in-part of application No. PCT/US98/02991, filed on Feb. 17, 1998, and a continuation-in-part of application No. PCT/US97/16712, filed on Sep. 22, 1997, and a continuation-in-part of application No. 08/717,370, filed on Sep. 23, 1996, now Pat. No. 6,083,585.

(51) Int. Cl.$^7$ .............................................. B29D 22/00
(52) U.S. Cl. .................. 428/35.7; 428/474.4; 525/168; 525/171; 525/177; 525/445; 528/298; 252/186.1
(58) Field of Search ............................ 428/474.4, 35.7; 525/168, 171, 177, 445; 528/298; 252/186.1

(56) References Cited

U.S. PATENT DOCUMENTS 6,083,585 A * 7/2000 Cahill ........................ 428/35.7

* cited by examiner

Primary Examiner—Leszek Kiliman
(74) Attorney, Agent, or Firm—Joseph DiSalvo

(57) ABSTRACT

Active oxygen scavenging compositions and their use in packaging articles are disclosed. The compositions are all plastic materials and are typically deployed as at least one layer in a multi-layered wall of a packaging article such as a bottle, can or film. The compositions are usually used in conjunction with added transition metal catalyst to enhance the uptake of oxygen. Use of the compositions and package constructions disclosed serves to lengthen the shelf life of packaged oxygen sensitive substances and/or diminish the need for refrigeration of the packages.

25 Claims, 4 Drawing Sheets

ACTIVE OXYGEN SCAVENGER COMPOSITIONS AND THEIR USE IN PACKAGING ARTICLES

RELATIONSHIP TO PRIOR APPLICATIONS

This application is a continuation in part of a US application filed on Sep. 23, 1996 having Ser. No. 08/717,370 now U.S. Pat. No. 6,083,585. It is also a continuation in part of a PCT application filed on Sep. 22, 1997 having Application Number PCT/US97/16712 and a continuation in part of a PCT application filed on Feb. 17, 1998 having Application Number PCT/US98/02991.

STATEMENT REGARDING FEDERALLY FUNDED RESEARCH (Not Applicable)

FIELD OF THE INVENTION

The invention generally relates to compositions having active oxygen scavenging capacity and the use of these compositions for improved packaging of oxygen sensitive substances. Formulations are disclosed which may be fabricated into packaging articles or used as container liners/coatings.

BACKGROUND OF THE INVENTION

Plastic materials have continued to make significant advancements into the packaging industry due to the design flexibility of their material and their ability to be fabricated in various sizes and shapes commonly used in the packaging industry. The deployment of plastic materials into packaging articles such as films, trays, bottles, cups, bowls, coatings and liners is already commonplace in the packaging industry. Although plastic materials offer the packaging industry many benefits with an unlimited degree of design flexibility, the utility of plastic materials has remained inhibited in situations where barrier properties to atmospheric gases (primarily oxygen) are necessary to assure adequate product shelf life. When compared to traditional packaging materials such as glass, steel or aluminum, plastics offer inferior barrier properties which limits their acceptability for use in packaging items that are sensitive to atmospheric gases, particularly when the exposure to the atmospheric gases will entail extended time periods. The packaging industry continues to seek packaging materials which offer the design flexibility of plastics and at the same time have the barrier properties of glass, steel or aluminum.

It should be recognized that there are two broad types of barriers for shielding packaged oxygen sensitive substances from oxygen (generally oxygen from air). One is known as a passive oxygen barrier and finds utility because of superior resistance to the permeation of oxygen through such constructions. Glass and metal are essentially perfect passive oxygen barriers. Condensation polymers, particular polyesters such as polyethylene terephthalate (PET) have found wide acceptance in the packaging industry and are moderately good passive oxygen barriers. Polyamides, such as polyhexamethyleneadipamide and polyphthalamides, are generally better passive oxygen barriers than polyesters when deployed in similar constructions.

The other type of oxygen barrier is known as an active oxygen barrier. An active oxygen barrier is a substance capable of intercepting and scavenging oxygen (by undergoing chemical reaction with the oxygen), for example, as the oxygen attempts to permeate through the packaging. A major salient feature of active oxygen scavengers is their ability not only to intercept oxygen from air as it attempts to reach the package cavity but also to provide the means to eliminate unwanted oxygen (often called head space oxygen) from within the package cavity wherein said oxygen may have been inadvertently introduced during packaging or filling. Only active oxygen scavengers can remove unwanted oxygen from the package cavity. Active oxygen scavenging implies, therefore, consumption of a material incorporated in the package. The material is progressively consumed so that the active oxygen scavenging ability is eventually depleted or at least diminished. However, this eventual depletion of the active oxygen scavenging moiety can be adjusted so that the depletion occurs only well after the required oxygen free shelf life of the packaged product which is typically one year or less.

Active oxygen scavengers are known and have been used in a variety of constructions. Optimally, active oxygen scavengers should have as many as possible, or at least some, of the features recited below:

(1) Their oxygen scavenging ability should be present both in the absence and/or in the presence of water or moisture.

(2) They should have clarity similar to that of PET or other packaging thermoplastics when necessary for production of clear bottles or films.

(3) They should be self-adherent to adjacent layer(s) when used as layer(s) in a multi-layer package construction.

(4) They should be evenly dispersed throughout the package so as to afford optimum and uniform opportunity to scavenge oxygen.

(5) They should have glass transition temperatures above filling and storage temperatures (at least above about 30° C.) so that they exist as solids or solid films for these purposes.

(6) When used as a container liner, they should be capable of being sprayed onto the inner surface of a container from an aqueous system (as opposed to a lacquer which would require evaporation of organic solvents).

(7) The decomposition products to which the active oxygen scavengers are decomposed after reaction with oxygen must not be deleterious to the packaged product or must be shielded from the packaged product.

(8) The mechanism of their reaction with oxygen must not be deleterious to the strength, clarity, or other salient features of the packaging article.

What is needed are active oxygen barrier materials possessing as many as possible of the features recited above, which may be produced at reasonable cost, and which have sufficient oxygen scavenging and barrier properties to offer the possibility of target shelf lives in the range of six months to two years for oxygen sensitive products. This invention further addresses such need.

INVENTION SUMMARY AND REVIEW OF PRIOR ART

In a commonly assigned, related, and co-pending US application filed on Sep. 23, 1996 and having Ser. No. 08/717,370, now U.S. Pat. No. 6,083,585 it was disclosed that certain hydrocarbons, such as polyolefins, (especially polydienes) when present in small amounts as polyolefin oligomer blocks in a block copolyester polymer added substantial active oxygen scavenging capacity to packaging polyesters which showed no active oxygen scavenging capacity what-so-ever in the absence of the polyolefin oligomer blocks. The oxygen scavenging copolyesters of the above-referenced application were comprised predominantly of packaging polyester segments with only an oxygen scavenging amount of polyolefin oligomer segments present to supply the oxygen scavenging capacity required for the intended packaging application. The copolyesters of the application having Ser. No. 08/717,370 now U.S. Pat. No. 6,083,585 were typically in the range of about 0.5–12 wt % polyolefin oligomer segments with the remainder comprising polyester segments. An especially preferred embodiment was a copolyester of about 4 wt % polyolefin oligomer segments with the remainder being polyester segments. Such block copolyesters comprising low weight percent levels of polyolefin oligomer segments have properties (such as melting point, viscosity, and clarity) very similar to the unmodified polyester from which the polyester segments were derived. In particular, layers in laminar packages and bottles having one or several layers of unmodified polyester and one or several layers of oxygen scavenging block copolyester as described above, were self-adherent and packaging articles appeared to be a monolithic (rather than layered) construction.

In related PCT Application Number PCT/US98/02991 which was filed on Feb. 17, 1998 the concept of implanting high capacity oxygen scavenging polyolefin oligomer segments was extended to polyamides. The above referenced PCT application disclosed block copolyamides comprising predominantly polyamide segments and an oxygen scavenging amount of polyolefin oligomer segments. As was the case for the earlier disclosed copolyesters, the corresponding copolyamides had properties very similar to unmodified polyamides, especially the polyamide from which the polyamide segments were derived. Polyamides are generally considered to be an inherently superior passive barrier as compared to polyesters. Thus copolyamides not only had substantial active oxygen scavenging capacity but also had improved passive barrier properties since they were comprised mainly of polyamide segments. In this application, additional oxygen scavenging moieties are disclosed which when incorporated into copolyesters or copolyamides exhibit the superior active oxygen scavenging capacity as was demonstrated in related prior applications. Also disclosed is the incorporation of active oxygen scavenging moieties into other polycondensates in addition to copolyamides and copolyesters. Further disclosed is the incorporation of active oxygen scavenging moieties into addition type (as opposed to condensation type) copolymers. Another embodiment of this application involves the incorporation of the previously disclosed oxygen scavenging moieties (such as polybutadiene oligomer) into an aqueous based spray formulation for use as a container liner/coating for removal of head space oxygen from canned goods via active oxygen scavenging.

In earlier and related patent applications previously cited above, it was disclosed that certain hydrocarbon materials could be adapted for deployment as active oxygen scavengers in packaging articles. These active oxygen scavengers when placed in the walls of a packaging article would intercept and react with oxygen (from air) as it attempted to pass through the package wall thereby shielding the package contents from oxygen and extending the useful shelf life of the packaged oxygen sensitive substance. When used in packaging, active oxygen scavengers can also react with and remove head space oxygen from the package cavity provided that means exist for oxygen in the package cavity to contact and react with the active oxygen scavenger. The ability of hydrocarbons to react with oxygen is well known in the art and began to attract research attention in the early twentieth century because of the unwanted degradation of such materials as automobile tires and vegetable oils. Eventually, it was recognized that the propensity of hydrocarbons to oxidize could be used to advantage in packaging when deployed as active oxygen scavengers. However, it was necessary to overcome two major obstacles in order to reduce the phenomenon to practice. First, it was necessary to identify those hydrocarbons which were reasonable to use from an economic view but which also had sufficient oxygen scavenging capacity to provide the desired shelf life. Secondly, it was necessary to find a way to innocuously incorporate these materials into modem packaging articles which could be fabricated using current state-of-the-art packaging equipment. Other considerations included clarity of the package and fitness for recycle of the package. These issues were addressed and largely resolved in earlier and related patent applications previously cited above.

In those earlier and related applications, it was disclosed that hydrocarbons such as polyolefin oligomers had sufficient commercial oxygen scavenging capacity to extend shelf life of oxygen sensitive products. Especially effective is polybutadiene oligomer. It is not fully understood whether or not this effectiveness is because carbon to carbon double bonds (olefinic unsaturation) are present in polybutadiene oligomer. It was also disclosed that the oligomers could be functionally terminated with a chemical group capable of entering into polycondensation reactions. The functionally terminated polyolefin oligomers were then incorporated as blocks in a polycondensate. The copolycondensates, such as copolyesters and copolyamides, were extremely compatible with commonly used packaging polycondensates and as such amenable for use in packaging articles. In this application, this concept has been extended to the use of a polyether oligomer (specifically polypropylene oxide) as the oxygen scavenging moiety. There is no olefinic unsaturation what-so-ever in polypropylene oxide oligomer. While not wishing to be bound by theory, it is Applicants' belief that oxygen scavenging occurs not only at the —$CH_2$— sites in polypropylene oxide but also at the —O— ether sites.

In order to incorporate the polypropylene oxide oligomer into a packaging copolycondensate, it was first necessary to add terminal functional groups capable of entering into polycondensation to the polypropylene oxide oligomers. Subsequently it was possible to form copolycondensates, such as copolyesters and copolyamides, having polypropylene oxide oligomer segments. The weight percent of polypropylene oxide oligomer segments, the molecular weight of the polypropylene oxide oligomers, and the average diameter size of the polypropylene oxide oligomer segments had to be determined to achieve optimum compatibility, clarity and scavenging capacity as was the case for copolycondensates having polyolefin oligomer segments. These polypropylene oxide oligomer containing copolycondensates are typically deployed as at least one layer in the wall of a multi-layer packaging article.

U.S. Pat. No. 5,605,996 (Chuu et al.) discloses the use of propylene oxide rubber as an oxygen scavenger but requires the presence of both olefinic unsaturation and moisture to function as an oxygen scavenger. Applicants' copolycondensates having polypropylene oxide oligomer blocks contain no olefinic unsaturation and scavenge oxygen either in the absence or presence of water (moisture) when promoted with suitable catalyst. U.S. Pat. No. 5,529,833 (Speer et al.) discloses a multi-layer oxygen scavenging structure wherein at least one layer consists essentially of an ethylenically unsaturated hydrocarbon. As noted above, applicants' copolycondensates having polypropylene oxide oligomer blocks contain no olefinic unsaturation.

The prior related applications cited above are all directed to compositions which comprise copolymers of condensation polymers, especially polyesters and polyamides. The copolymers are active oxygen scavengers because blocks of segments comprising oxygen scavenging moieties have been implanted into the copolycondensates. In the prior related applications, Applicants have disclosed the use of polypropylene, poly(4-methyl)1-pentene and polybutadiene as oxygen scavenging moieties which are effective when included in a polycondensate. In this application, the use of polypropylene oxide oligomer has been disclosed as an oxygen scavenging moiety. While many embodiments have been disclosed involving the use of the previously disclosed oxygen scavenging copolycondensates, compatibility with package construction is optimal when the oxygen scavenging copolycondensates are used in polycondensate based packages. For example, the oxygen scavenging copolyesters are most compatible when used with adjacent layers of packaging polyester. In a similar manner, the oxygen scavenging copolyamides are most compatible when used with adjacent layers of packaging polyamide. While packaging articles based on polycondensates are very common, there still exists a wide variety of applications for packaging articles based on addition type polymers.

In several embodiments of this invention, applicants have extended the concept of incorporation of high oxygen scavenger capacity moieties into addition type polymers so as to create addition type oxygen scavenging copolymers. These oxygen scavenging addition type copolymers may be used in any suitable embodiment but are intended primarily for use in addition polymer based packaging articles such as those comprising polyolefins including polypropylene, polyethylene, and mixtures of the preceding. As was done for polycondensates, Applicants disclose the use of polyolefin oligomers, preferably polypropylene, poly(4-methyl)1-pentene, polybutadiene, and also the use of polypropylene oxide as preferred oxygen scavenging moieties which are effective scavengers when included in polyaddition polymers. Further, Applicants preferred method of preparation is by transesterification of pre-made polyaddition polymers. Some addition polymers may already have esterification reaction sites on the polymer backbone, for example those comprised of acrylic acid or acrylic acid derivatives. Of course many polyaddition polymers, such as polyolefins, have no esterification sites. In such instances, it is generally necessary to treat the addition polymer with a substance which can add the needed esterification sites to the addition polymers. A preferred class of reactants for such purposes is an unsaturated acid, its anhydride, or derivatives thereof. Maleic anhydride (or derivatives of it) is especially preferred and such a process is generally well known in the art as maleation.

For further understanding it may be useful to consider Formulas I and II below:

I. H—O—(OSM)—O—H

II. $H_2N$—(OSM)—$NH_2$

In Formulas I and II, OSM represents a divalent oxygen scavenging moiety such as polypropylene oxide or the other scavenging moieties recited above. In Formula I the dihydroxy functionally terminated form of OSM is shown and Formula II the diamino functionally terminated form of OSM is shown. The OSM may be singly functionalized or may be functionalized to a degree greater than two, but double functionality is shown in Formulas I and II as one of many possible degrees of functionality. Also, other functional groups attached to the OSM are possible and suitable for the purposes of this invention, but only hydroxy and amino are shown for the sake of explanation and illustration. It will be obvious to those of ordinary skill in the art that the entities represented in Formulas I and II are capable of entering into polycondensation and/or transesterification reactions. In this invention, Applicants react species of Formulas I or II with addition polymers which have acid sites (or other suitable reaction sites) and incorporate the OSM into the addition polymer by condensation or esterification. The net result affords a simple and direct method for adding a precise amount of oxygen scavenging capacity in the form of the various OSM's recited above to an addition polymer.

Generally, the copolyaddition polymers will be comprised predominantly of polyaddition segments and have only enough OSM segments to provide the required oxygen scavenging capacity for the planned application. Predominantly, in this sense, is defined as over 50 wt % polyaddition segments in the addition type oxygen scavenging copolymers. In practice, the copolyaddition oxygen scavengers will be comprised of OSM segments in the range of 0.5 to 12 wt % of the scavenging copolymers. Preferably the OSM segments will comprise from about 2 to about 8 wt % of the copolymer, and most preferably from about 2 to about 6 wt % of the copolymer. As was the case for oxygen scavenging copolycondensates, it is desirable to use only the minimally required amount of OSM segments so that the oxygen scavenging addition copolymer has properties very similar to unmodified addition polymers especially the addition polymer from which its segments were derived. A PCT Patent Application (Ching et al.) published on Dec. 19, 1996 and designated as WO 96/40799 discloses a polyethylenic polymer having a backbone with esterification/transesterification sites located thereon and methods of esterification of said sites. The Ching et al. patent further discloses attachment (at the active sites) on the polymer of pendant groups which have a carbon atom having an attached hydrogen atom wherein said carbon atom is adjacent to a list of moieties as further recited in the Ching et al. disclosure. In practice, the Ching et al. reference ultimately discloses a composition comprising a transition metal and a modified polyethylenic polymer capable of scavenging in the range of about 40–63 cc of oxygen per gram of composition after 28 days. The oxygen scavenging copolyaddition polymers disclosed by Applicants are easily distinguished from the Ching et al. disclosure in that Applicants' copolymers are capable of scavenging about 83 cc of oxygen per gram of copolymer in 28 days under similar conditions, even in the absence of transition metal catalyst In another embodiment of this invention, Applicants disclose a method for adding active oxygen scavenging capacity to widely used container coating compositions. It is a common practice in the packaging industry to use very thin plastic coatings on the inside of metal (iron or aluminum) can surfaces to prevent acidic food and beverages from corrosive attach and associated contamination with ionic metals. Particularly acute is the situation for canned carbonated beverages, such as beer and soda pop, where the dissolved carbon dioxide assures a very acidic and corrosive condition. In addition to corrosion prevention, another desirable attribute for can coating is the ability to remove unwanted oxygen from the package cavity where in such oxygen was inadvertently introduced during filling of the container. In can coatings, there is little concern with regard to oxygen which may enter the package cavity from outside since the can metal is essentially a perfect passive oxygen barrier to permeation of outside oxygen. For packaging of beer in cans, current technology is capable of placing beer in sealed cans at oxygen levels as low as about 200 PPB. Pasteurization of the beer may further reduce the oxygen level to as low as 100 PPB which remains in the can to react with and deteriorate the beer stored in the metal can. The taste aspects of beer are highly dependent upon reaction with trace amounts of oxygen. Further reduction of the amount of head space oxygen in a beer can provides the means for better tasting beer and/or longer shelf life for beer packaged in cans, hence the need for active oxygen scavengers in can coating plastics.

Some of the most commonly used can coatings are epoxy-amine-acrylate (EAA) coatings which are sprayed on to an unfilled metal cup (i.e., a can which has not yet had the top placed on it) as a water borne composition prior to a short cure of about 2 minutes at about 200° C. Later, similarly coated and cured can tops are applied to complete the package. In all instances, curing of a water borne spray is more environmentally friendly than evaporation of organic solvents from a lacquer. For coating cans intended for use with food, beverages, and comestible products in general, the advantages of working with a water borne spray coating versus and organic solvent spray (lacquer) are even more pronounced. Applicants in this invention disclose a method for incorporation of the species of Formulas I and II above into a water based can coating emulsion thereby adding oxygen scavenging capacity to can lining formed therefrom. A PCT Patent Application (Bansleben et al.) published on Sep. 12, 1997 and designated as WO 97/32925 discloses active oxygen scavenging can coatings. However, the Bansleben et al. reference discloses only the use of an oxygen scavenging "lacquer" which may be used as a coating on cans and other rigid containers. While there are other major differences, Applicants can coatings are easily distinguished from the Bansleben et al. coating in that they are formed from a water based emulsion and applied to the can as a water borne spray as opposed to a lacquer.

DETAILED DESCRIPTION OF THE INVENTION

Oxygen Scavenging Container Coating Embodiments

Figure 1:
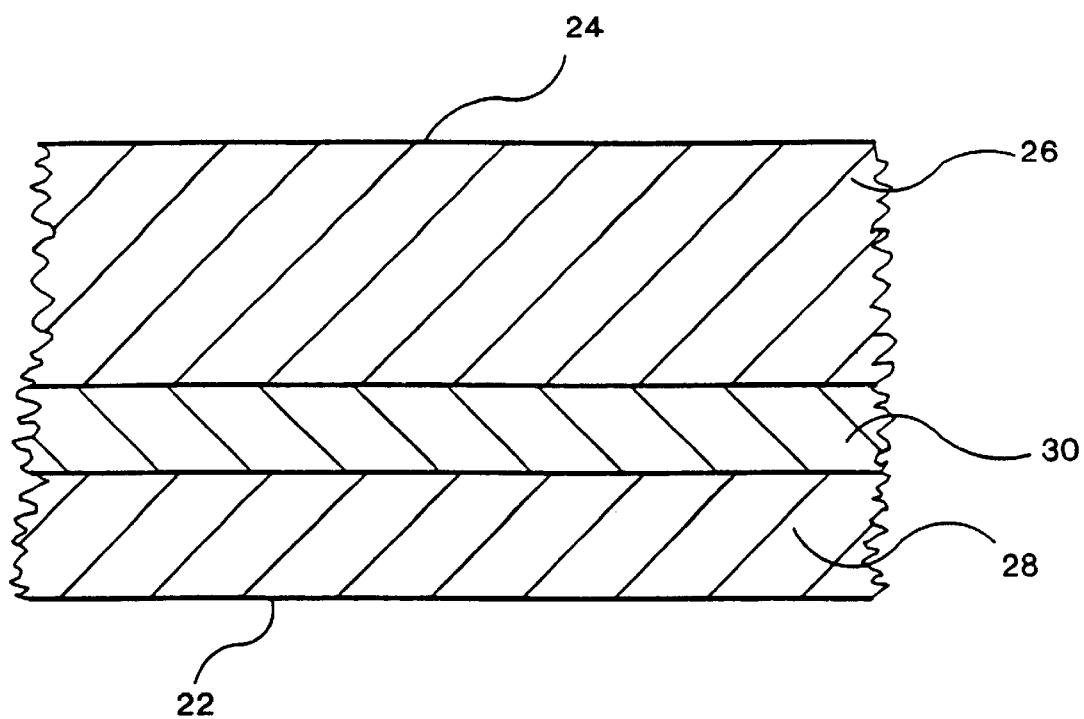
FIG. 1 is a cross sectional view of a preferred oxygen scavenging bottle wall and film construction.

This embodiment serves to solve the problem of how to incorporate a solid oxygen scavenging polymeric substance in a can coating in such a manner that the inclusion of the oxygen scavenger does not denigrate the viscosity/rheological characteristic of a water based emulsion. It is generally more environmentally friendly to apply plastic can coats via a water borne spray or emulsion rather than non-aqueous alternatives where the spray is in the form of a lacquer based on organic solvents which must eventually be evaporated to form the can coating. This is even more important for the coating of cans which are destined to contain comestible products.

The use of epoxy-amine-acrylate (EAA) formulations applied as a water based spray for coating cans is already widely in use commercially. Billions of containers are coated annually with such formulations. Typical of such coating formulations are ICI/Glidden's (EAA) aqueous emulsions which routinely contain about 18% solids in the emulsions. Applicants have found that oxygen scavenging properties can be added to such a coating by directly including a small amount of the species depicted previously in Formulas I and II. Preferred for can coatings are the species of Formulas I and II when the OSM is polybutadiene oligomer or a polypropylene oxide oligomer. Especially preferred is the dihydroxy terminated polybutadiene oligomer because of its high oxygen scavenging capacity and it commercial availability.

In all instances, an objective of this invention is to use only the minimum amount of OSM necessary so that modified compositions remain similar in properties to unmodified compositions. In this embodiment, using only a small amount of OSM serves to make the modified EAA as similar as possible to the EAA absent the addition of OSM. By conducting spraying experiments using equipment similar to that which is used for can coating production runs, Applicants determined that reactive EAA dispersions having in the range of 1 to 5 wt % (with respect to the weight of the solids in the dispersion) of functionally terminated OSM were still essentially identical in physical properties to the unmodified EAA. Also addition to the EM mixture of a transition metal in the range of 10–500 PPM (calculated as metal with respect to the weight of the solids in the emulsion) to serve as a catalyst for reactions of the OSM with oxygen did not negatively affect the spray and/or cure properties of the water borne emulsion. The preferred transition metal catalyst is cobalt and especially preferred is cobalt added in the form of a cobalt carboxylate, most especially preferred is cobalt from cobalt octoate. Other spray tests were made wherein the composition further comprised 50–500 PPM (with respect to the weight of the solids in the emulsion) benzophenone (BNZ) to further enhance the rate of oxygen uptake by the OSM. Again, EAA compositions comprising (1) functionalized OSM and transition metal or (2) functionalized OSM, transition metal, and BNZ were found to spray and cure into a can lining in a manner virtually identical to the unmodified EAA when deployed in the ranges recited above.

Applicants further determined that the OSM, transition metal, and BNZ could be added directly and independently to the EAA emulsion or that the OSM, transition metal, and BNZ could be mixed together and then added to the EAA emulsion. Applicants' preferred method of preparing the formulation comprised mixing at least the OSM and the transition metal catalyst prior to mixing with the EAA emulsion. Regardless of the order in which the components of the composition were mixed or added, it was necessary to store the formulated composition in an inert environment, such as under a nitrogen blanket, in order to prevent degradation (gelling/thickening) of the final composition prior to spraying. Even when stored under nitrogen, the modified emulsions should be applied within 72 hours of formulation for best results. As was determined in the related applications, a molecular weight for the OSM in the range of about 1000–3000 produced good results and is preferred. The decomposition products of the OSM's employed in the compositions of this invention (after reaction with oxygen)

are not precisely known, nor is there any reason to believe they may be toxic. However, Applicants prefer to practice this invention by using two thinner coats of EAA emulsion to form the can coating. A first coat of EAA emulsion containing the oxygen scavenger additives (OSM, transition metal, and BNZ) is typically directly sprayed on to the can metal (usually iron or aluminum) and at least partially cured. Then a second coat of unmodified EAA emulsion is applied and cured. As has been the case in related cases, such a coating construction permits only the unmodified EAA to be in contact with the can cavity and/or its contents. In such a construction, it would be necessary for headspace oxygen to permeate through the second (inner) coating of EAA to reach the OSM and react with it. But all reaction products are isolated from the can cavity and its contents by the inner coating of EAA.

Conversely, the contents of the can cavity are isolated from the modified EAA coating.

A review of the usage conditions for a 12 oz (355 ml) beer can helps to understand some of the further-necessary considerations. Such a beer can when commercially sprayed with EAA emulsion in the form of a cup (i.e., a beer can absent the beer can lid) typically ends up with a cured coating having a weight of about 0.1 g. The can lid is added later and may be also lined with oxygen scavenging modified EAA or unmodified EAA. In the Examples section of this application, it will be shown that a cured oxygen scavenging EAA can lining formulation further comprising about 2.7 wt % OSM, 200 PPM transition metal, and 200 PPM BNZ consumes in excess of 5.0 cc of oxygen per gram at room temperature and pressure in about 70 days. In theory then, the 0.1 9 of material present in the can cup lining could consume about 0.5 cc of oxygen in 70 days. Major US beer producers estimate that over 95% of their beer is in consumer hands within 60 days of bottling/canning so a 70 day shelf life would account for delivery of most of the canned beer. As previously noted, current state-of-the-art beer packaging technology is capable of filling beer cans with as little as 100 PPB of oxygen remaining in the canned beer after Pasteurization. From this it can be calculated that when filled, a 12 oz beer can having 100 PPB of oxygen contains about 0.025 cc of oxygen at room temperature and pressure. Thus in this hypothetical case, there is a 20 fold theoretical excess of oxygen scavenging capacity available. Use of EAA comprising about 5 wt % OSM could raise this to 40 fold excess, but would be reduced back to 20 fold excess if the can is lined with two layers, each of which is only half the thickness of a single layer lined can. A 20 fold theoretical oxygen scavenging capacity excess is reasonable in view of the necessity of the head space oxygen to permeate through the inner EAA layer defining the can cavity before it reaches the EAA layer having the OSM.

While the disclosure has been made largely in terms of can coatings, those skilled in the art will recognize that many container constructions could benefit from the oxygen scavenging compositions disclosed and their method of use. Application of the features of this invention to containers other than cans is envisioned by Applicants and considered to be within the scope of this invention. For example, PPG Industries produces a series of water based EAA emulsions applied as a water borne spray to form an inner lining for polyester (PET) and other plastic containers sold under the trade name BAIROCCADE®. Modification of the PPG emulsion to include OSM, transition metal, and BNZ in about the same proportions as disclosed above for can linings would yield an oxygen scavenging lining for plastic containers. Plastic bottles often have detrimental amounts of oxygen dissolved in or adsorbed on the plastic walls of the bottle. Application of an active oxygen scavenging lining to such bottles would serve the purpose of eliminating such dissolved or adsorbed oxygen. As in the case of can lining, the application to a bottle of a modified layer followed by an inner unmodified layer which forms the surface of the package cavity would be a preferred embodiment.

Polypropylene Oxide Oligomer as an Oxygen Scavenging Moiety

In the earlier and related applications, copolycondensates, (such as copolyesters and copolyamides) having segments of oxygen scavenging moieties (OSM) consisting of polyolefin oligomers were disclosed. More specifically the polyolefin oligomers used were selected from the list consisting of polypropylene, poly(4-methyl)1-pentene and polybutadiene.

These polyolefin oligomers were first provided with functional terminal groups (usually dual functionality) capable of entering into polycondensation or transesterification reactions and subsequently included as minor percentages (based on weight) of the segments in copolycondensates. A typical weight range usage involved copolycondensates comprising 0.5 to 12 wt % polyolefin oligomer segments. Copolyesters species of this type were found to have high oxygen scavenging capacity, existed as solids at ambient temperatures in the range of 0° C. to 60° C., and had good clarity, especially when (1) used as a layer adjacent to a layer of unmodified polyester, (2) used in the presence of added transition metal as a catalyst for oxygen uptake (i.e., transition metal catalyst was added in addition to residual catalyst present, if any, from the copolymer formation), (3) subjected to a biaxial orientation of about a 2.5×4.0 stretch, (4) were made by transesterification in a reactive extruder, and (5) had pyromellitic dianhydride added during formation as a chain extending agent so as to achieve optimum molecular weight for the copolyester.

Applicants now disclose the use of polypropylene oxide oligomer as an OSM in a manner similar to what has previously been disclosed for polyolefin oligomers as briefly described above. Of course, the polypropylene oxide oligomer must first be terminally functionalized with groups capable of entering in polycondensation and/or transesterification reactions. Formulas I and II above show several options for such terminally functionalized species and reveal how such species could participate in polycondensation and/or transesterification. In Formulas I and 11, OSM could represent a divalent polypropylene oxide oligomer having a low molecular weight (MW) typically in the range of about 100 to 10,000 and preferably in the range of 1,000 to 3,000. Use of lower MW polypropylene oxide oligomer helps assure dispersion of the polypropylene oxide oligomer segments more uniformly throughout the oxygen scavenging copolycondensates. Also it has been found that lower molecular weight polyolefin oligomer leads to improved clarity in applications where clarity is of importance.

Formulas I and II show difunctionality on the polypropylene oxide oligomer but the polypropylene oxide oligomer may be singly functionalized or functionalized to a degree greater than two. Only hydroxy and amino functionalization are shown in Formulas I and II as examples that will react, but those of ordinary skill in the art will recognize that many other options are possible including carboxy, epoxy, alkoxy. The functionalization of the polypropylene oxide oligomer forms no part, per se, of this invention and such terminally functionalized species are well known in the art and commercially available. The copolycondensates of this invention may be prepared by direct (continuous and/or batch) techniques to the degree of scavenging capacity needed by substitution of a molar equivalent amount of the species of Formula I or II, for example, for about the same molar amount of the monomer having similar terminal functionality which would normally be used to prepare the unmodified polycondensate.

Applicants also disclose the use of another class of oxygen scavenging moieties which may be designated broadly as methyl pendant aromatic compounds. Observations by Applicants indicate that —$CH_2$— groups attached to an aromatic nucleus have commercially acceptable oxygen scavenging capacity. For this invention, methyl pendant aromatic substances are defined to be chemical compounds which are aromatic and have at least one methyl group attached to the aromatic nucleus. Examples of methyl pendant aromatic substances are toluene, the xylenes, the trimethyl benzenes, the mono, di, tri- etc. methyl naphthalenes. A requirement of such compounds is that they be attached to the copolycondensate by a linkage to one or several methyl carbon atoms regardless of their attachment, if at all, via the aromatic part of the molecule. Examples of such methyl pendant aromatic substances after dual functionalization and consistent with the species of Formula I above include the dihydroxymethyl benzenes and the dihydroxymethyl naphthalenes. These compounds may be only singly functionalized or functionalized to a degree greater than two provided more than two pendant methyl groups are available. In a similar manner the diamino counterparts of the above would satisfy the conditions for Formula II. It is significant to note that use of polypropylene oxide oligomer or methyl pendant aromatic compounds as OSM leads to the formation of copolycondensates devoid of olefinic unsaturation, provided none was present in the unmodified polycondensate.

Applicants prefer to prepare the copolycondensates by transesterification in a reactive extruder. This is achieved by melting the unmodified polycondensate in a reactive extruder and simultaneously introducing the desired weight percentage of functionalized OSM such as polypropylene oxide oligomer to the melt. Under appropriate conditions, transesterification occurs resulting in formation of a block copolycondensate having, for example, polypropylene oxide oligomer segments and polycondensate segments. Generally the transesterification is done under vacuum and optionally in the presence of a transition metal transesterification catalyst. Cobalt is the preferred catalyst, and cobalt deployed in the form of a cobalt carboxylate is especially preferred, with cobalt octoate as the most especially preferred catalyst. When used, the catalyst is deployed in the range of 10–300 PPM of the mixture in the extruder.

Only the amount of polypropylene oxide oligomer or other OSM segments needed to meet the required oxygen scavenging capacity are introduced into the copolycondensate. In all cases the copolycondensate comprises predominantly (over 50 wt % of the segments) polycondensate segments. It is desired, however, to make oxygen scavenging copolycondensate having properties as similar as possible to unmodified polycondensate especially the polycondensate from which it was derived. As such, the amount of polypropylene oxide oligomer or other OSM segments is typically held to the range of 0.5 to at 12 wt % of the copolycondensate, preferably from about 2 to about 8 wt %, and most preferably from about 2 to about 6 wt % of the copolycondensate.

The copolycondensates formed by transesterification in a reactive extruder are capable of scavenging oxygen in the solid state (below their glass transition temperatures ($T_{(g)}$) and in the absence or presence of water or moisture. It is desirable to form copolycondensates which are solids at ambient filling, storage and shelf temperatures of from 0° C. to 60° C. It is frequently necessary to add a chain extending agent to the reactive extruder to form copolycondensates having $T_{(g)}$'s above 60° C. The chain extending agent is typically deployed in the range of 10 to 5,000 PPM with respect to the weight of the mixture in the extruder. While there may be some minor weight loss due to volatile materials, it is to be noted that the chain extending agent will be present in the resultant copolymer to about the same extent as it is present in the extruder. Aromatic anhydrides are the preferred chain extending agents and pyromellitic dianhydride is especially preferred.

Formation and use in packaging articles of many different types of oxygen scavenging copolycondensates are envisioned by applicants. A non-limiting list of polycondensates to which polypropylene oxide glycol oligomer and other OSM segments could be added includes polyesters, polyamides, polysulfones, polyols, polyethers, polyketones. The reaction conditions in the extruder for formation of the copolycondensates varies depending upon the nature of the polycondensate feed. To some extent, the temperature profile of the extruder is related to the melting temperature of the polycondensate feed. For example a temperature range of about 250° C.–280° C. is used for formation of copolyesters while a temperature range of about 280° C.–300° C. is used for copolyamides. Extruder residence times are typically in the range of about 2–5 minutes. Those of ordinary skill in the art will recognize the need to adjust and optimize extruder reaction conditions to accommodate the polycondensate feed properties. Typically the extruder reaction is conducted under vacuum to draw off volatile components. The copolycondensate formed is extruded as pellets or through a slot die and made into film. In either case, the copolycondensate is sealed in air and moisture proof containers in an inert environment, such as under a blanket of nitrogen, until needed for fabrication of packaging articles In one embodiment, the oxygen scavenging copolycondensates of this invention are deployed as a layer adjacent to an unmodified layer of the same polycondensate, especially the polycondensate from which the polycondensate segments in the copolycondensate were derived. In such a packaging construction, the adjacent layers have nearly identical physical properties readily lending themselves to manipulation on existing packaging equipment already in place for the unmodified polycondensate. Also, the adjacent layers tend to be self-adherent and appear to be a monolithic construction. The wide use of polyesters and polyamides in the packaging industry dictates that oxygen scavenging copolyesters and copolyamides will be the copolycondensates of choice for use in the embodiment described above.

An especially preferred type of package wall, bottle wall or film construction comprises a three layered embodiment as shown in FIG. 1. The outside of the bottle or package wall 24 is formed by a thicker layer 26 of unmodified packaging polycondensate and may be comprised of recycled material in whole or in part since it does not contact the package cavity or the packaged material. The inside of the bottle or package wall 22 which defines the package cavity is formed by a thinner layer 28 of unmodified packaging polycondensate. The middle layer 30 is comprised of the oxygen scavenging copolycondensates of this invention, i.e., those having polypropylene oxide oligomer segments, for example. The middle layer may be diluted with unmodified copolycondensate and typically further contains added transition metal catalyst, a photo-active substance, and other routinely used additives. While the embodiment of FIG. 1 may require special extrusion equipment, it is still preferred for the following reasons: (1) it creates a structure with a relatively thick layer of exposed polycondensate which serves as a good passive barrier to oxygen from air, (2) the inner layer in contact with the packaged material is also polycondensate, typically one which has a long history of usage and acceptance for packaging of consumable materials, (3) placing the copolycondensates of this invention between two layers of unmodified polycondensates having at least reasonable passive barrier properties isolates the oxygen scavenging copolymers from direct contact with air or oxygen and preserves their oxygen scavenging ability to be applied only to oxygen which passes through the unmodified polycondensate layers, and (4) the copolycondensates and the unmodified polycondensates can be selected so as to have such similarity that they bond together when co-extruded without the need for or use of a tie layer of adhesive.

The preferred three layer embodiment described above is most easily achieved by co-extrusion of one layer of copolycondensate with the two layers of unmodified polycondensate. The copolymer is so chemically similar to the unmodified polymer that the three layers uniformly adhere to each other and form a monolithic structure upon cooling. No tie layer adhesives are required. However, in the articles of manufacture of this invention where recycling is not important, additional (and possibly diverse) layers can be incorporated to improve adhesion, improve barrier properties, reduce costs'. It may be possible to achieve the preferred three layered embodiment by techniques other than co-extrusion such as by coating with solutions or heat fusion of separate layers. Any method other than co-extrusion may have disadvantages of (1) reduction of scavenging potential by unwanted and/or inadvertent exposure of the oxygen scavenging copolymers to air or oxygen; and (2) additional processing steps. For fabrication of bottles, joining the three layers by adhesives would work against the objective of recyclability unless the adhesive was based on the copolycondensate/polycondensate. For production of films and wraps, recyclability is not nearly as important a consideration yet as it is for bottles. In fact, for films, it may even be desirable to use layers of the copolymers of this disclosure in conjunction with layers of other diverse materials such as polyethylenevinyl alcohol layers and polyolefin layers. While immediate co-extrusion of these copolymers may be the most preferred use for them, other use options are also available. For example, the copolymers could be blended as a concentrate with other polycondensates for film or bottle manufacture, or be used as an inner liner or layer in a multi-layer construction sense, for example, in packaging electronic components.

In one broad embodiment then, this invention discloses a laminar composition comprising at least one layer of a packaging material and at least one layer of an active oxygen scavenging copolycondensate comprising predominantly polycondensate segments and an active oxygen scavenging amount of OSM segments such as polypropylene oxide oligomer segments. Predominantly, as used above, means that the copolymer is at least 50 wt % polycondensate segments. Typically, the OSM segments comprise , 0.5 to , 12 wt % of the copolycondensate, preferably about 2.0 to about 8.0 wt % and most preferably about 2.0 to about 6.0 wt % of the copolymer. The layer of packaging material is typically a thermoplastic packaging material and normally one selected from the list of thermoplastic materials considered safe for use with food as listed in USA 21 CFR §177.1010–177.2910 (revised April, 1997 edition). However, the copolycondensates of this invention may be used as active oxygen scavengers to consume head space oxygen in the form of an inner coating en cans or glass jars/bottles. In these applications, the layer of packaging material would comprise metal or glass. The preferred layer of packaging material comprises polycondensate and especially preferred are the polycondensates from which the polycondensate segments in the copolymer were derived.

However, a significant advantage of the oxygen scavenging copolycondensates of this invention is that they exist as solids at ambient temperatures and therefore can be made into films or layers independently of their potential and probable use as layer(s) in a multi-layered wall of a packaging article. As such, the copolycondensates of this invention having predominantly polycondensate segments and an oxygen scavenging amount OSM segments such as polypropylene oxide oligomer segments may be used in a packaging article as a layer in a multi-layered wall of the packaging article regardless of the nature of the other layers in the wall. Thus, the other layer(s) in the wall may be any packaging material including thermoplastics, glass, can metals (iron or aluminum), paperboard. The thermoplastic packaging materials used as layers in conjunction with the copolycondensates of this invention will typically be those as listed USA 21 CFR §177.1010–177.2910, revised April 1997 edition. Especially preferred thermoplastics are polyesters, polyamides, polyolefins, and polyethylenevinyl alcohol.

In order to optimize oxygen scavenging properties of the copolycondensates, catalysts are frequently added to enhance the uptake of oxygen by the copolycondensates. The catalysts employed are transition metals and are typically added to the copolymer during the fabrication stage of the packaging article. The transition metal is added in the range of 10–2,000 PPM with respect to the weight of the copolymer and is added in addition to remaining residual catalyst (if any) used to make the copolycondensate from direct polymerization or transesterification. For reasons not completely understood by Applicants, addition of transition metal catalyst in the range specified also seems to improve the clarity of the polycondensates, especially after biaxial orientation. The preferred transition metal catalyst is cobalt. Especially preferred is cobalt added in the form of cobalt carboxylate, and most especially preferred is cobalt added in the form of cobalt octoate.

Applicants have also discovered that employment of a photo-active substance, such as benzophenone (BNZ), further enhances the uptake of oxygen by the copolycondensates of this invention. As with the transition metal catalyst, the BNZ is typically added to the copolymer during the fabrication stage of the packaging article in an amount ranging from 10–500 PPM with respect to the weight of the copolycondensate.

In certain packaging applications, clarity of the copolycondensates of this invention and clarity of package walls comprising a layer of the copolycondensates of this invention are important considerations. Applicants have discovered that biaxial orientation of the copolycondensates of this invention improves clarity beyond what would be expected simply from diminishment of the thickness of the layer due to the stretch. The biaxial orientation of the copolycondensate is normally achieved by subjecting the copolymer to a 2.5×4.0 stretch, typical of the industry in the production of plastic bottles and packages. The oxygen scavenging copolycondensate may be first biaxially oriented and then incorporated into a packaging article or the biaxial orientation may be performed simultaneously with the other layer (s) which comprise the multi-layer package wall.

Oxygen Scavenging Addition Type Copolymers

Oxygen scavenging copolycondensation polymers disclosed above and in related applications provide for an especially advantageous embodiment wherein the modified condensation polymer (i.e., the oxygen scavenging copolycondensate having OSM's) is deployed as a layer in a packaging article wall adjacent to a layer of unmodified similar condensation polymer, especially the polycondensate from which the polycondensation segments in the copolycondensate are derived. In 1929 Carothers (W. H. Carothers, J. Am. Chem. Soc. 51,2548 (1929)) proposed a generally useful differentiation between two broad classes of polymers. One of the Carothers' classes was condensation polymers in which the molecular formula of the structural (repeating) unit or units in the polymer lack certain atoms present in the monomer or monomers from which it was formed, or to which it may be degraded by chemical means. Carothers' other class was addition polymers in which the molecular formula of the structural (repeating) unit or units in the polymer is identical with that of the monomer from which the polymer is derived. Packaging articles based on addition type polymers, such as polyolefins, especially those derived from the monomers ethylene, propylene or styrene, continue to be important in the packaging industry. Examples of such packaging include normally refrigerated plastic milk and juice bottles. As previously disclosed, the use of oxygen scavenging copolycondensates as layers in the walls of packages based on addition type polymers is a possibility but does not afford an opportunity to achieve optimal construction of extreme similarity in properties for adjacent layers in a package wall. In an effort to solve this problem, Applicants disclose oxygen scavenging copolymers comprising predominantly (over 50 wt %) polyaddition segments and an oxygen scavenging amount of OSM segments. A typical usage range will comprise copolyaddition polymers comprised of OSM segments in the range of 0.5 to 12 wt % of the copolymer. The preferred range of OSM segments is from about 2 to 8 wt % and especially preferred is from about 2 to 6 wt % of the copolymer.

The OSM's envisioned for use include polyolefin oligomers such as polypropylene, poly(4-methyl)1-pentene and polybutadiene; polypropylene oxide oligomer, and methyl pendant aromatic compounds. The preferred OSM's are polybutadiene oligomer and polypropylene oxide oligomer.

As was the case for oxygen scavenging copolycondensates, the oxygen scavenging copolyaddition polymers of this invention are preferably made by transesterification. In order for this to occur (1) it is necessary that the OSM's have terminal functionality (such as those depicted by Formulas I and II) capable of entering into condensation/transesterification reactions, and (2) there must be reaction sites (e.g., acid sites, anhydride sites, ether sites, hydroxy sites, ester sites.) On the unmodified addition polymer which is to be transformed into an oxygen scavenging copolymer. Many addition polymers have such reactions sites available and include those addition polymers comprised of monomers such as methacrylic acid, methacrylic acid, esters, of the proceeding vinylalcohols. Also envisioned are oxygen scavenging copolymers whose segments are derived predominantly from ionomeric polyolefins such as the Surlyn® resin series available from du Pont. For addition polymers having no suitable transesterification reaction sites, it is necessary to first treat the polymer with a compatibilization agent which will add suitable reaction sites to the addition polymer. A preferred class of reactant for adding reaction sites is an unsaturated acid, its anhydride, or substituted derivatives of the preceding. Maleic anhydride (or its derivatives) is especially preferred and such a process is well known in the art as maleation. While the availability of such sites on an addition polymer are necessary to produce the oxygen scavenging copolyaddition polymers of this invention, unmodified addition polymers having such sites are known in the art and form no part, per se, of this invention.

Addition polymers having reaction sites as described above exhibit chemical behavior similar to condensation polymers for transesterification type reactions and will react with OSM's which are functionally terminated with groups capable of entering into condensation/transesterification reactions, e.g., those depicted by Formulas I and II above. The transesterification is conducted in an extrusion reactor as was done for preparation of oxygen scavenging copolycondensates previously disclosed in this and related applications. As previously indicated, those of ordinary skill in the art will recognize the necessity of adjusting the temperature. profile of the extruder reactor to suit the needs of the unmodified addition polymer feed. Again, a major consideration in selecting reaction temperature is the melt temperature of the polymer feed which will be made into a copolymer in the extruder reactor. Surprisingly, many of the other reaction variables are maintained in the ranges similar to those used for production of copolycondensates. These similar copolymer synthesis parameters include (1) reaction with functionally terminated OSM's which are the same type and MW, (2) reactor residence times, (3) reaction under vacuum, (4) use of transition metal transesterification catalysts of the types and in the ranges previously specified for copolycondensates, (5) use of a chain extending agent to achieve the preferred molecular weight of the copolymer, (6) extrusion of the copolymer into pellets or films, and (7) storage of the copolymer pellets or films in sealed containers under nitrogen.

The method of use of the oxygen scavenging addition type copolymers is also analogous to that disclosed for oxygen scavenging copolycondensates. The oxygen scavenging addition copolymers are usually deployed in such a manner that they comprise at least one layer in a wall of a multi-layered package wall. In a series of embodiments, the oxygen scavenging copolymers are used in constructions where other layer(s) in the multi-layer package wall are comprised of other packaging materials such as glass, can metals such as aluminum or iron, cardboard, thermoplastics, (especially those as listed in USA 21 CFR §177.1010–177.2910, revised April 1997 edition), or other suitable packaging materials. For such constructions the preferred packaging materials present in the other layer(s) in the multi-layered package wall are addition polymers, and especially preferred is the addition polymer from which the addition polymer segments in the oxygen scavenger copolymer were derived. Transition metal catalysts and photoactive materials (BNZ) may optionally be added in the manner and amount as previously disclosed for the oxygen scavenging copolycondensates. The oxygen scavenging addition copolymers may optionally be subjected to biaxial orientation in the amount and manner as previously disclosed for the oxygen scavenging copolycondensates.

EXAMPLES

Examples 1–2

Examples 1 and 2 will show the method of preparation of oxygen scavenging addition type copolymers and their oxygen scavenging capacity.

Block Addition Copolymer Formation

The oxygen scavenging addition copolymers of this invention may be made on a pilot scale in a Werner and Pfleiderer ZSK-30 extruder. Example 2 and control Example 1 were processed in a Werner and Pfleiderer ZSK-30 co-rotating twin screw extruder with fully intermeshing screws having a 45:1 length to screw diameter. Pellet feed materials were metered into the first extruder section using KTRON loss-in-weight pellet feeders. The unmodified feed pellets used for these examples was ethylene methacrylic acid (EMA) polymer available under the trade name Nucrel® 599 from du Pont. Polybutadiene (PBD) oligomer diol of MW 1230 (R20LM available from Elf Atochem) is a viscous liquid and was separately conveyed using a Ruska piston style pump. The diol was injected directly onto the screws 15 diameters downstream of the EMA pellet feed at which point the polymer pellets were completely fluxed. A vacuum of at least (76.8 cm) (30 inches) was pulled on a side port of the extruder prior to processing the melt stream through a gear pump for copolymer production. The copolymer product was extruded through a 45.2 cm slot die manufactured by Extrusion Dies, Inc. (EDI) (an EDI 6 inch die onto a two roll cooling stack and then recovered as film on a constant tension winder. After recovery, the films were placed in heat sealable foil bags, purged with nitrogen, and then sealed. Extruder reactor conditions were as noted in Table 1 below.

The pressure values listed in Columns 9 and 10 of Table 1 are as indicated by the pressure gauge.

Oxygen Uptake of Block Addition Copolymers

Figure 2:
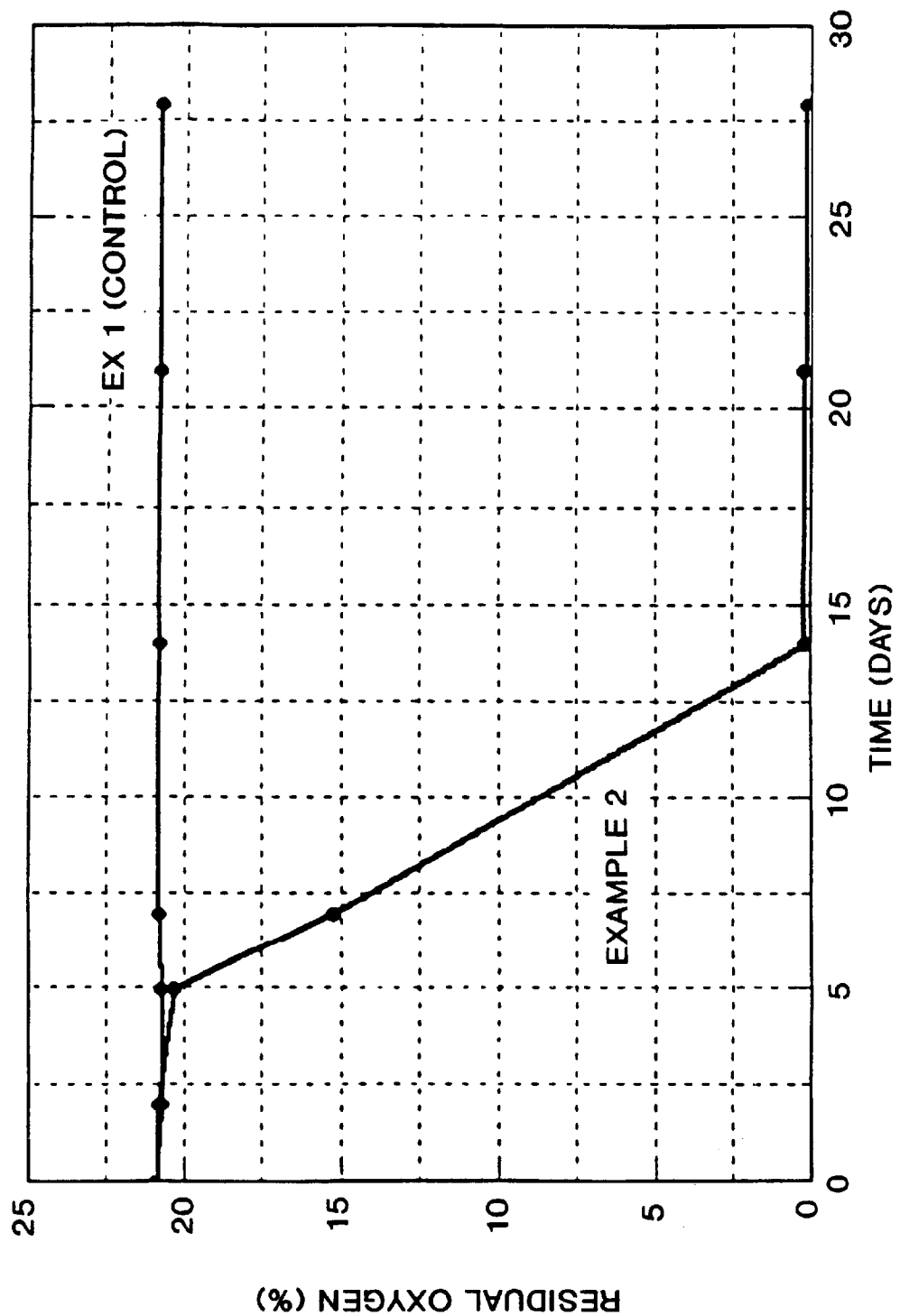
FIG. 2 is a graph showing the oxygen uptake of oxygen scavenging addition copolymers over a 28 day period at 60° C.

Oxygen uptake was tested using film samples of 10 g The samples were placed in 500 cc sample jars containing ordinary room air, sealed, and then held at 60° C. for the duration of the test. No transit on metal catalyst or photoactive compounds were added to the samples. Try amount of oxygen as percent in the headspace gas (air) was sampled regularly over a 28 day period via a septum on each sample jar. The oxygen present was monitored on a Mocon HS750 oxygen analyzer by withdrawal of 3 cc of gaseous aliquots at periodic intervals over the 28 day period of the test. The data from these samples are shown graphically in FIG. 2. Surprisingly, there was virtually no uptake of oxygen by the EMA polymer control of Example 1, which may be due, in part, to the absence of transition metal catalyst. After about a five day induction period, the copolymer samples having 4 wt % PBD oligomer segments showed a dramatic uptake of oxygen and had consumed virtually all of the oxygen in the jar by about day 14. Since the copolymer sample jars began with about 102 cc of oxygen (20.9% of 490 cc), it can be seen that the capacity of the 4 wt % PBD copolymers is about 10 cc/g of copolymer after only 14 days. The actual scavenging capacity after 28 days could not be calculated from Example 2 since there was essentially no oxygen left in the sample jar to scavenge after day 14.

Examples 3–6

Examples 3–6 will show the method of preparation of an oxygen scavenging EAA container coating and its capacity for scavenging oxygen.

Into a glass jar was placed 100 g of ICI/Glidden's Water Reducible Spray Liner, Product Designation 640° C. 696 (18% solids) whose composition is listed in Table 2. To this aqueous emulsion was added 0.48g of Elf Atochem R45 HT polybutadienediol (PBD MW of 2800). When dried as a can coating, the dried coating comprised 2.7 wt % PBD. The mixture was stirred magnetically for one hour, then capped and sealed until it was coated onto aluminum foil with a gated blade so as to emulate a can lining. The coated foil was placed on an aluminum plate which was heated on a laboratory hot plate set at 227° C. (440° F.) for 2 minutes to obtain a baked on coating. Sixteen such foils (21 cm×5.5 cm surfaces) were fan folded, and placed into a 250 cc Mason jar equipped with a metal cap containing a rubber sampling septum. The storage temperature of 60° C. was selected in an effort to achieve accelerated testing. This composition and experiment was designated as Example 3.

TABLE 1

Preparation of Block Addition Copolymer Extruder Conditions

| Sample | Screw Speed | Torque | Polymer Rate | Additive Rate | Additive Percent (w/w) | Form of Product | Vacuum | Extruder Exit | Die |
|---|---|---|---|---|---|---|---|---|---|
| 1 EMA | 60 Rpm | 85% | 6.8 Kg/hr (15 Lb/Hr) | | NA | Film | 71.1 cm Hg (28.0 in hg) | 68.9 bars (1000 Psig) | 53.8 bars (780 Psig) |
| 2 EMA Modified | 123 Rpm | 53% | 6.9 Kg/hr (15.2 Lb/Hr) | 272 g/hr (0.6 Lb/Hr) | 4.0% | Film | 71.1 cm Hg (28.0 in hg) | 37.9 bars (550 Psig) | 49.0 bars (710 Psig) |

Extruder Zone Temperatures in ° C.

| Sample | Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 | Zone 14 | Gear Pump | Die |
|---|---|---|---|---|---|---|---|---|---|---|---|---|---|---|---|---|
| 1 EMA | 120 | 150 | 175 | 175 | 175 | 175 | 175 | 175 | 175 | 175 | 175 | 200 | 200 | 200 | 200 | 200 |
| 2 EMA Modified | 120 | 150 | 175 | 200 | 230 | 230 | 175 | 175 | 175 | 175 | 175 | 200 | 200 | 200 | 200 | 200 |

TABLE 2

Chemical Composition of Water Reducible Spray Liner: ICI/Glidden Paints - Product 640 C 696 (MSDS listed)

| Trade Name | Chemical Name | CAS Number | Wt. % |
|---|---|---|---|
| Dimethylaminoethanol | Ethanol, 2-(dimethylamino) | 108-01-0 | 1–5 |
| Melamine Resin | 1,3,5-Thiazine-2,4,6-triamine, polymer with formaldehyde, methylated | 68002-20-0 | 1–5 |
| N-Butanol | 1-butanol | 71-36-3 | 5–10 |
| 2-Butoxyethanol | Ethanol, 2-butoxy | 111-76-2 | 5–10 |
| Formaldehyde | Formaldehyde | 50-00-0 | 0.01 |
| Acrylic Latex | 2-Propenoic acid, 2- | 64112-61-4 | 5–10 |

TABLE 2-continued

Chemical Composition of Water Reducible Spray Liner:
ICI/Glidden Paints - Product 640 C 696 (MSDS listed)

| Trade Name | Chemical Name | CAS Number | Wt. % |
|---|---|---|---|
| | methyl-, polymer with ethenylbenzene, ethyl 2-propenoate and N-((2-methylpropoxy)methyl)-2-propenamide | | |
| Epoxy Ester | Phenol, 4,4-(1-methylethylidene)bis-, polymer with (chloromethyl)oxirane | 25068-38-6 | 1–5 |
| Epoxy Acrylic Resin | 2-Propenoic acid, 2-methyl-, polymer with (chloromethyl) oxirane, ethenylbenzene and 4,4'-(1-methylethylidene)bis(phenol) | 28262-39-7 | 5–10 |
| Water | Water | 7732-18-5 | 60–70 |

Another similar composition and experiment, designated as Example 4, was prepared and performed. For Example 4, 0.48 g of PBD diol was added to the 100 g of the EAA emulsion as in Example 3 to achieve the same 2.7 wt % PBD (based on 100% weight of solids in the emulsion or cured weight of can liner). Also, 200 PPM (metal) cobalt octoate and 200 PPM benzophenone (BNZ) were separately added to the EAA prior to stirring. The 200 PPM of cobalt and BNZ were calculated with respect to the weight of the solids in the EAA emulsion. As for Example 3, a total of 4.5 g of coating (which was 2.7 wt % PBD) was used in this manner to determine oxygen uptake by periodic sampling during storage at 60° C. under 0% relative humidity (ORH).

Another similar composition and experiment, designated as Example 5, was prepared and performed. The composition of Example 5 was the same as for Example 4 except that the 0.48 g PBD diol, the 200 PPM cobalt (as metal) from cobalt octoate and the 200 PPM BNZ were thoroughly mixed prior to introduction to the EAA emulsion. The 200 PPM of cobalt and BNZ were calculated with respect to the weight of the solids in the EAA emulsion. As for Example 3 and 4, a total of 4.5 g of coating (which was 2.7 wt % PBD) was used in a similar manner to determine oxygen uptake by periodic sampling during storage at 22° C. under 100% relative humidity. Obviously a temperature of 22° C. and 100% relative humidity more closely emulates the conditions inside a can of comestible product during storage as opposed 10 to 60° C. and 0% relative humidity used for Examples 3 and 4. Example 6 was the control where 4.5 g of unmodified EAA coating was prepared and tested in a manner similar to that used for Examples 3–5.

In all three test experiments (Examples 3–5) it was found necessary to maintain the modified EAA emulsion in an oxygen-free environment such as under a blanket of nitrogen. The presence of air (oxygen) caused the modified EAA emulsions to gel and would render them unsprayable in an industrial setting. Under nitrogen, the modified EAA emulsions showed no indication of increase in viscosity when used within 3 days of preparation.

Figure 3:
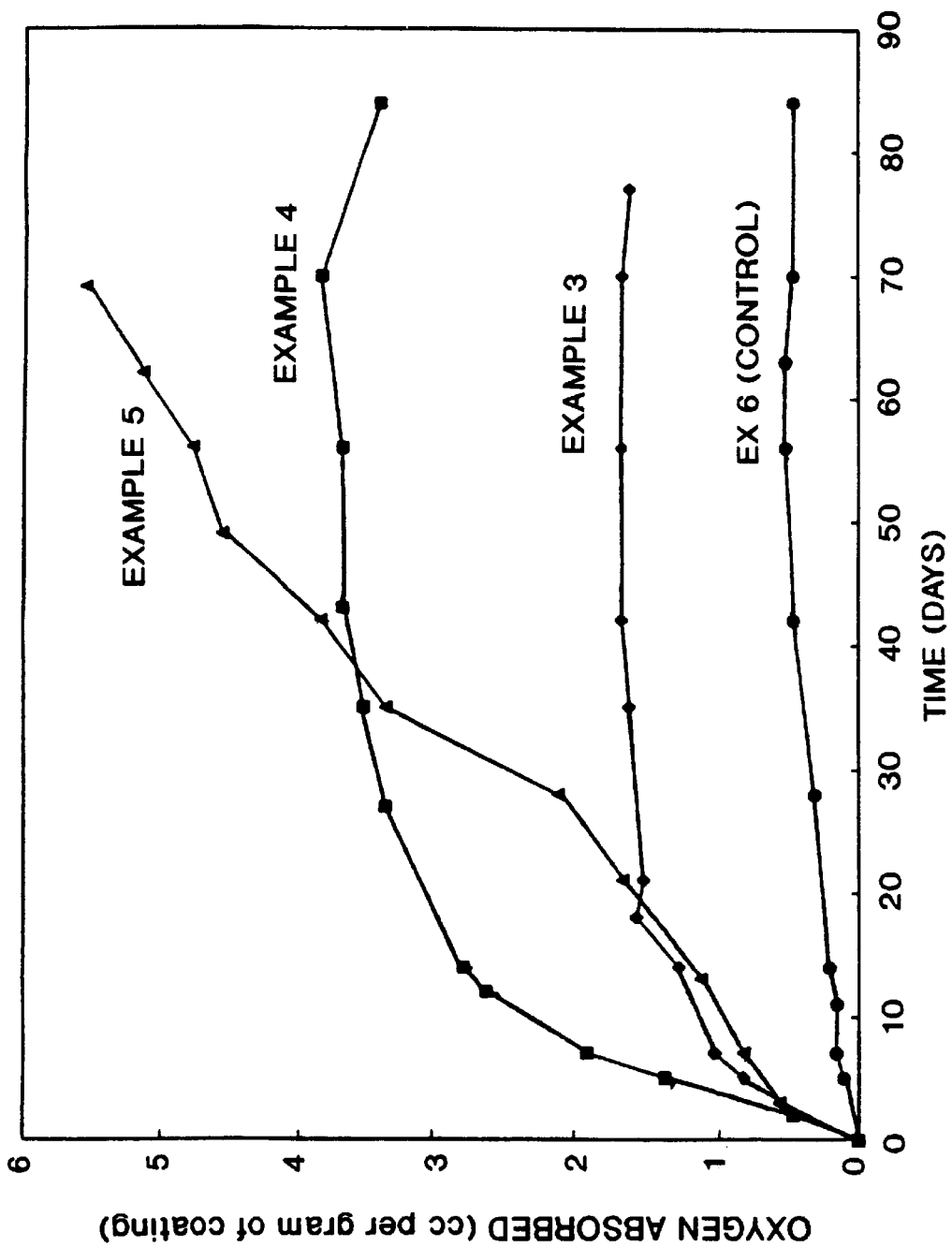
FIG. 3 is a graph showing the amount of oxygen scavenged per gram of can lining material for various can lining compositions.

The oxygen present in the headspace in the jars was monitored on a Mocon HS750 oxygen analyzer by withdrawal of 3 cc of gaseous aliquots at periodic intervals over the 85 day duration of the test period. The percent oxygen remaining in the headspace was converted, by calculation, to the amount of oxygen scavenged per gram of can liner for each of Examples 3–6. The results are displayed graphically in FIG. 3. It is obvious from FIG. 3 that premixing of the PBD, cobalt octoate, and BNZ produces a much high oxygen scavenging capacity can liner. Applicants speculate that the premixed concentrate (Ex. 5) provides a better opportunity for intimate contact of the catalysts with the PBD than in the dilute mix (Ex. 4). The results from Example 3 having no catalyst clearly shows diminished scavenging capacity for formulations which are otherwise essentially identical.

Oxygen Scavenging Block Copolycondensates

The following examples will show the method of synthesis of oxygen scavenging copolycondensates of this invention and their ability and capacity to behave as active oxygen scavengers. These copolycondensates may be made on a pilot scale in a Werner and Pfleiderer ZSK-30 extruder. The materials were processed in a Werner and Pfleiderer ZSK-30 co-rotating twin screw extruder with fully intermeshing screws having a 45:1 length to screw diameter. Pellet feed materials were metered into the first extruder section using KTRON loss-in-weight pellet feeders. When more than one pelletized component was fed in this manner, the minor components were slaved to the primary resin feeder and all feeds ratios were maintained by the controls. Liquid components, including polypropylene oxide oligomer, were fed using either a Lewa diaphragm pump which was supplied from a heated and agitated feed vessel or a Ruska piston style pump. The OSM, and additives if any, was injected directly onto the screws 15 diameters downstream of the EMA pellet feed at which point the polymer pellets were completely fluxed. A vacuum of at least (76.9 cm) (30 inches) was pulled on a side port of the extruder prior to processing the melt stream through a gear pump for copolymer production. The copolymer product was recovered either by (1) extruding through a three hole strand die, cooling the strands on a Sandvic cooling belt, and then pelletizing or (2) extruding through a 45.2 cm slot die manufactured by Extrusion Dies, Inc. (EDI) an EDI 6 inch die) onto a two roll cooling stack and then recovered as film. After recovery, the copolymer products were placed in heat sealable foil bags, purged with nitrogen, and then sealed. The materials prepared for testing are characterized in Table 3.

HYTREL 5556, 7.5 MFR is a polyester elastomer available from du Pont. PET 7207 is polyethylene terephthalate available from Shell. R20LM PBD is a polybutadiene oligomer diol of about 1280 MW available from Elf Atochem. A-3000 is an oxygen scavenging copolyester comprising about 96 wt % PET segments and about 4 wt % PBD oligomer segments. CAPRON 8270 is polyhexamethyleneadipamide available from Allied. JEFFAMINE

TABLE 3

Material, Composition of Samples

| SAMPLE NUMBER | RUN DATE | BASE RESIN | REACTIVE COMPONENT | COMMENTS |
|---|---|---|---|---|
| 19440-1184 | 02/25197 | HYTREL 5556, 7.5 MFR | | Neat Pellet, Control |
| 19440-124-2 | 05/22/97 | PET 7207, IV = 0.72 | | Control |
| 19440-128-2 | 06/23/97 | PET 7207 | NEAT | Control |
| 19440-130-2 | 06/26/97 | PET 7207 | NEAT | |
| 19440-131-1 | 06/27/97 | PET 7207 | Elf Atochem R20-LM PBD | A-3000 Control |

TABLE 3-continued

Material, Composition of Samples

| SAMPLE NUMBER | RUN DATE | BASE RESIN | REACTIVE COMPONENT | COMMENTS |
|---|---|---|---|---|
| 19440-132-1 | 07/01/97 | PET 7207 | Elf Atochem R20-LM PBD | A-3000 Control |
| 19440-133-2 | 07/02/97 | CAPRON 8270, MI = 0.5–0.7 | NEAT | Nylon 6 Control |
| 19440-134-1 | 07/08/97 | CAPRON 8270, MI = 0.5–0.7 | NEAT | Nylon 6 Control |
| 19440-136-2 | 07/15/97 | PET 7207 | NEAT | Control |
| 19440-138-1 | 07/16/97 | PET 7207 | JEFFAMINE D-2000 | –14.7% JEFFAMIN (NMR) |
| 19440-139-1 | 07/17/97 | PET 7207 | JEFFAMINE D-2000/ COBALT | –2.0% JEFF. (NMR), –250 PPM COB. |
| 19440-140-1 | 07/17/97 | CAPRON 8270, MI = 0.5–0.7 | JEFFAMINE D-2000/ COBALT | –4% JEFF., –500 PPM COB. |
| 19440-140-2 | 07/17/97 | CAPRON 8270, MI = 0.5–0.7 | JEFFAMINE D-2000/ COBALT | 4% JEFF., –500 PPM COB. |
| 19440-142-1 | 09/09/97 | PET 7207 | Elf Atochem R20-LM PBD | First Ruska pump sample |
| 19440-143-1 | 09/11/97 | PET 7207 | Dow P-1200 | |
| 19440-144-1 | 05/15/97 | PET 7207 | Dow P-1200/ Cobalt Octoate | 500 ppm cobalt octoate |
| 19440-146-1 | 09/18/97 | PET 7207 | JEFFAMINE D-2000/ COBALT | 500 ppm cobalt octoate |
| 19440-147-1 | 09/19/97 | CAPRON 8270, MI = 0.5–0.7 | NEAT | |
| 19440-147-2 | 09/19/97 | CAPRON 8270, MI = 0.5–0.7 | JEFFAMINE D-2000 COBALT | 500 ppm cobalt octoate |
| 19440-148-1 | 09/25/97 | PET 7207 | 25:75, DOW P-1200/ EA PBD | |
| 19440-149-1 | 09/25/97 | PET 7207 | 25:75 DOW/ PBD + CAT + BENZO | 200 ppm cobalt; 100 ppm benzophenone |
| 19440-150-1 | 09/26/97 | PET 7207 | 50:50, bow P-1200/EA PBD | |
| 19440-151-1 | 09/26/97 | PET 7207 | 50:50 DOW/ PBD +CAT + BENZO | 200 ppm cobalt; 100 ppm benzophenone |
| 19440-154-1 | 10/01/97 | PEBAX 5533 | NEAT | |
| 19440-159-1 | 10/06/97 | CAPRON 8270, MI = 0.5–0.7 | NEAT | |
| 19440-160-1 | 10/06/97 | CAPRON 8270, MI = 0.5–0.7 | Dow P-1200 | |
| 19440-161-1 | 10/07/97 | CAPRON 8270, MI = 0.5–0.7 | Dow P-1200 + cobalt octoate | 500 ppm cobalt octoate |

D2000 is a diamino terminated polypropylene oxide oligomer of about 2000 MW available from Huntsman. P1200 is a dihydroxy terminated polypropylene oxide oligomer of about MW 1200 available from Dow. BENZO is benzophenone. PEBAX 5533 is a polyamide elastomer available from Elf Atochem.

Figure 4:
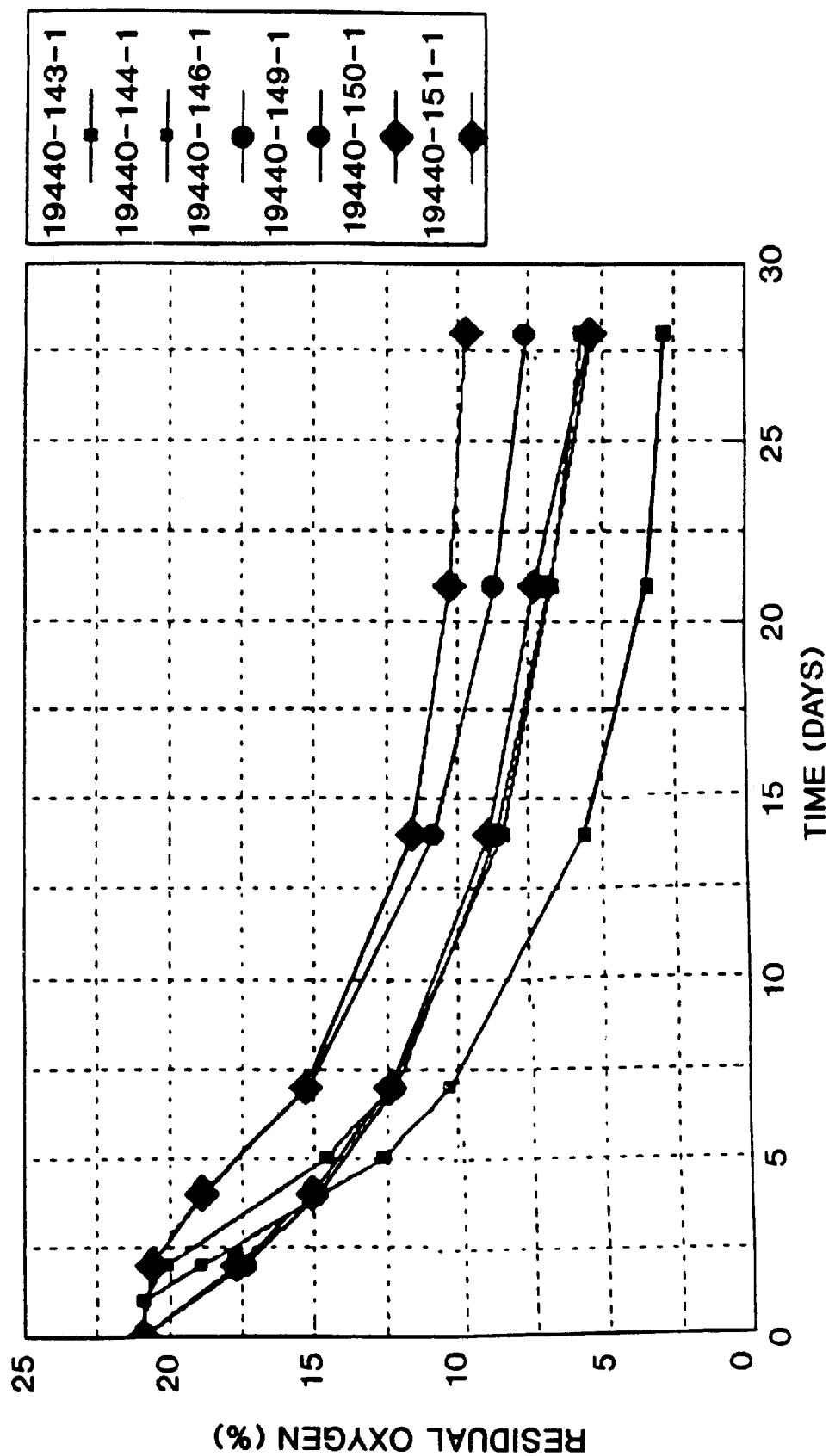
FIGS. 4 is a graph showing the oxygen scavenging capacity of several block condensation copolymers of this invention.

The samples of Table 3 were tested for oxygen scavenging capacity by the same technique used for Examples 1–2. Ten grams of each of the samples from Table 3 were placed in 500 ml glass jars, and then monitored for oxygen content of the air in the jar over a 28 day period. The jars were held at 60° C. and 0% relative humidity. All of the copolycondensates of Table 3 showed substantial oxygen scavenging capacity, especially when enhanced by the addition of cobalt and/or benzophenone. FIG. 4 graphically shows the oxygen uptake results obtained for some of the PET block copolymers of Table 3.

The examples described above are intended to be illustrative of the many numerous embodiments for the oxygen scavenging compositions disclosed in this application. Those of ordinary skill in the art will recognize that variations in these compositions, including the use of various additives and additive packages, are encompassed by this disclosure and are within the scope of the invention.

We claim:

1. An oxygen barrier laminar composition comprising a layer of packaging material and a layer of active oxygen scavenging copolycondensate comprising predominantly polycondensate segments and a minor amount of oxygen scavenging moiety segments; and wherein said copolycondensate (A) has a glass transition temperature above 60° C. and scavenges oxygen in its solid state at ambient temperatures in the range of 0–60° C. and (B) is devoid of ethylenic unsaturation.

2. The laminar composition of claim 1 wherein the packaging material is a thermoplastic resin.

3. The laminar composition of claim 1 wherein the packaging material is a polycondensate.

4. The laminar composition of claim 3 wherein the polycondensate is selected from the group consisting of polyamide and polyester.

5. The laminar composition of claim 1 wherein the oxygen scavenging segments of the copolycondensate comprises from 0.5 to 12 wt % of the copolymer.

6. The laminar composition of claim 1 wherein the oxygen scavenging moiety segments are selected from the group consisting of polypropylene, poly(4-methyl)1-pentene, polypropylene oxide oligomer, methyl pendant aromatic compounds, and mixtures of the preceding.

7. A multi-layered wall packaging article having disposed within the package wall a laminar composition comprising a layer of packaging material and a layer of active oxygen scavenging copolycondensate comprising predominantly polycondensate segments and a minor amount of oxygen scavenging moiety segments; and wherein said copolycondensate (A) has a glass transition temperature above about 60° C. and scavenges oxygen in its solid state at ambient temperatures in the range of 0–60° C. and (B) is devoid of ethylenic unsaturation.

8. A method of extending the useful shelf life of an oxygen sensitive substance which comprises packaging said oxygen sensitive substance in a multi-layered wall packaging article having disposed within the package wall a laminar composition comprising a layer of packaging material and a layer of active oxygen scavenging copolycondensate comprising predominantly polycondensate segments and a minor amount of oxygen scavenging moiety segments; and wherein said copolycondensate (A) has a glass transition temperature above about 60° C. and scavenges oxygen in its solid state at ambient temperatures in the range of 0–60° C. and (B) is devoid of ethylepic unsaturation.

9. An oxygen scavenging composition comprising (A) a copolycondensate which is devoid of ethylenic unsaturation comprising (1) predominantly polycondensate segments, (2) a minor amount of oxygen scavenging moiety segments, and (3) 10–5,000 PPM pyromellitic dianhydride with respect to the weight of the copolycondensate, and (B) a transition metal catalyst which has been added to the extent of 10–2000 PPM with respect to the weight of the copolycondensate and is added in addition to any residual transition metal which may be present from formation of the copolycondensate.

10. The oxygen scavenging composition of claim 9 wherein the transition metal catalyst is cobalt.

11. The oxygen scavenging composition of claim 10 wherein the source of cobalt is cobalt octoate.

12. The oxygen scavenging composition of claim 9 wherein the oxygen scavenging moiety segment is selected from the group consisting of polypropylene, poly(4-methyl)1-pentene, polypropylene oxide oligomer, methyl pendant aromatic compounds, and mixtures of the preceding.

13. An oxygen scavenging composition comprising (A) a copolycondensate which is devoid of ethylenic unsaturation comprising predominantly polycondensate segments and an oxygen scavenging amount of oxygen scavenging moiety segments, (B) a transition metal catalyst which has been added to the extent of 10–2000 PPM with respect to the weight of the copolycondensate and is added in addition to any residual transition metal which may be present from formation of the copolycondensate, and (C) benzophenone in the range of 10–500 PPM with respect to the weight of the copolycondensate.

14. The oxygen scavenging composition of claim 13 wherein the oxygen scavenging moiety segment is selected from the group consisting of polypropylene, poly(4-methyl)1-pentene, polypropylene oxide oligomer, methyl pendant aromatic compounds, and mixtures of the preceding.

15. The oxygen scavenging composition of claim 13 wherein the copolycondensate is further subjected to biaxial orientation comprising a stretch of about 2.5×4.0 to improve clarity.

16. A water based epoxy-amine-acrylate emulsion capable of forming a can coating via a water borne spray further comprising from 1 to 5% functionalized polybutadiene oligomer with respect to the weight of the solids in the emulsion and 10–500 PPM transition metal catalyst calculated as metal with respect to the weight of the solids in the emulsion.

17. The emulsion of claim 16 further comprising 50–500 PPM benzophenone with respect to the weight of the solids in the emulsion.

18. An oxygen scavenging container lining formed from the application of a water borne spray of the oligomer and catalyst containing emulsion of claim 16.

19. An oxygen barrier laminar composition comprising a layer of packaging material and a layer of active oxygen scavenging addition copolymer comprising predominantly polyaddition segments and an a minor amount of oxygen scavenging moiety segments; and further comprising transition metal catalyst which has been added to the extent of about 10–2000 PPM with respect to the weight of the addition copolymer and is added in addition to any residual transition metal which may be present from formation of the copolymer.

20. The laminar composition of claim 19 wherein benzophenone has been added to the copolymer in the range of 10–500 PPM with respect to the weight of the copolymer.

21. The laminar composition of claim 19 wherein polyaddition segments of the copolymer are derived from monomers selected from the list consisting of acrylic acid, methacrylic acid, esters of the preceding, ethylene, propylene, vinyl alcohol, and styrene.

22. The laminar composition of claim 19 wherein oxygen scavenging moiety segments comprise from 0.5 to 12 wt % of the copolymer.

23. The laminar composition of claim 19 wherein the oxygen scavenging moiety segment is selected from the group consisting of polypropylene, poly(4-methyl)1-pentene, polybutadiene, polypropylene oxide oligomer, methyl pendant aromatic compounds, and mixtures of the preceding.

24. The laminar composition of claim 19 wherein the packaging material is an addition polymer.

25. The laminar composition of claim 24 wherein the oxygen scavenging copolymer comprises addition segments derived from the packaging material addition polymer.

* * * * *

UNITED STATES PATENT AND TRADEMARK OFFICE
CERTIFICATE OF CORRECTION

PATENT NO.    : 6,346,308 B1
DATED         : February 12, 2002
INVENTOR(S)   : Paul J. Cahill et al.

It is certified that error appears in the above-identified patent and that said Letters Patent is hereby corrected as shown below:

Column 4,
Line 13, "into modem packaging articles" should read -- into modern packaging articles --

Column 8,
Line 31, "to the EM mixture of" should read -- to the EAA mixture of --

Column 9,
Line 32, "the 0.1 9 of material" should read -- the 0.1 g of material --

Column 10,
Line 47, "In Formulas I and 11," should read -- In Formulas I and II, --

Column 15,
Line 54, "ester sites.) On the unmodified" should read -- ester sites) on the unmodified --
Lines 58-59, "such as methacrylic acid, methacrylic acid," should read -- such as acrylic acid, methacrylic acid, --

Column 17,
Line 55, "No transit on metal catalyst" should read -- No transition metal catalyst --
Line 56, "the samples. Try amount of" should read -- the samples. The amount of --

Column 19,
Line 49, "opposed 10 to 60ºC and" should read -- opposed to 60ºC and --

Column 20,
Line 60, Table 3, "19440-1184  02/25197" should read -- 19440-118-4  02/25/97 --

UNITED STATES PATENT AND TRADEMARK OFFICE
CERTIFICATE OF CORRECTION

PATENT NO. : 6,346,308 B1
DATED : February 12, 2002
INVENTOR(S) : Paul J. Cahill et al.

It is certified that error appears in the above-identified patent and that said Letters Patent is hereby corrected as shown below:

Column 21,
Line 16, Table 3, "- 14.7%" should read -- ~ 14.7% --
Lines 18 and 19, Table 3, "-2.0% JEFF. (NMR), -250" should read
-- ~2.0% JEFF. (NMR), ~250 --
Lines 21 and 22, Table 3, "-4% JEFF., -500" should read
-- ~4% JEFF., ~500 --
Lines 23 and 24, Table 3, "-4% JEFF., -500" should read
-- ~4% JEFF., ~500 --
Line 43, Table 3, "PET 7207 50:50, bow P-" should read -- PET 7207 50:50, DOW P- --

Column 22,
Line 61, "devoid of ethylepic unsaturation" should read -- devoid of ethylenic unsaturation --

Signed and Sealed this

Sixth Day of April, 2004

JON W. DUDAS
*Acting Director of the United States Patent and Trademark Office*